Oct. 23, 1945. A. P. GRABUS, JR., ET AL 2,387,439
METHOD OF SEALING CONTAINERS
Filed Feb. 5, 1942
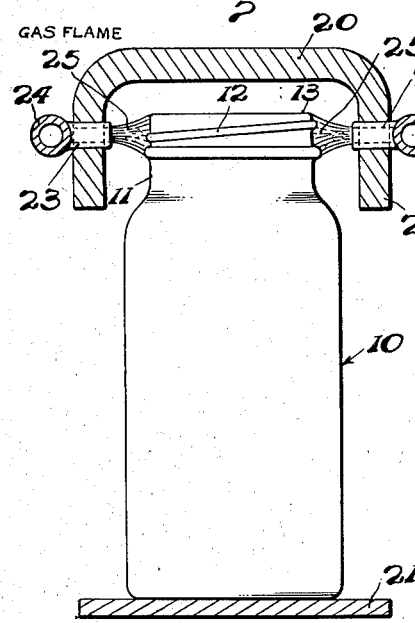
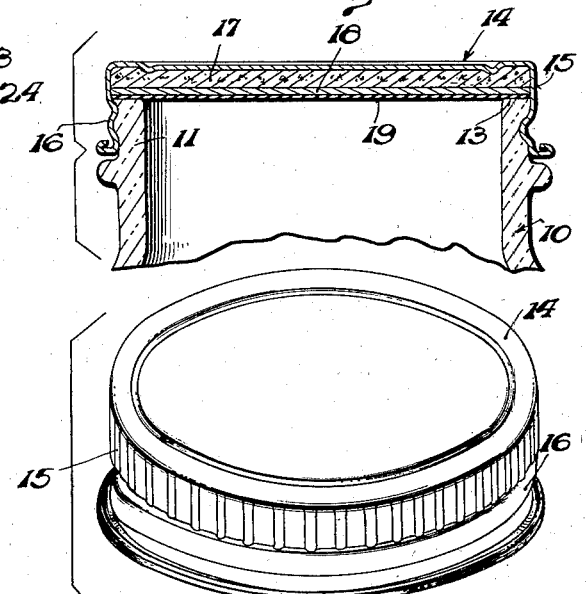
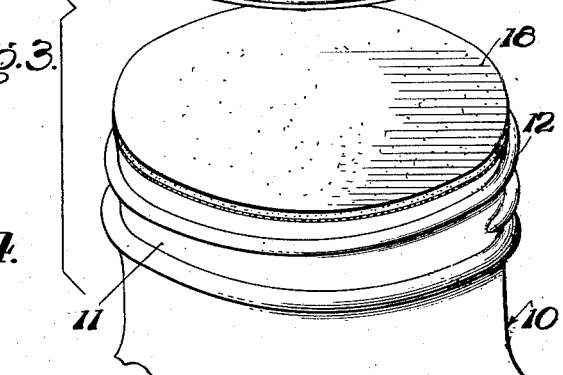
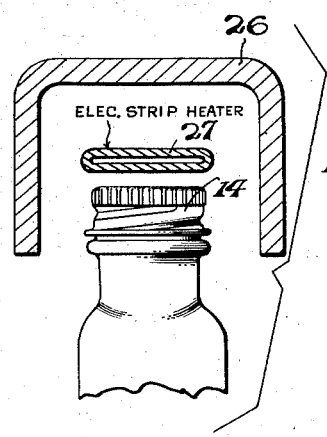
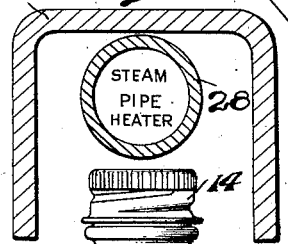
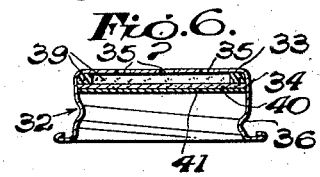
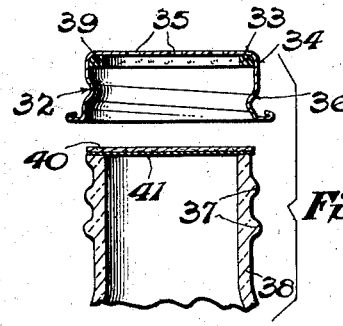
Inventors
Andrew P. Grabus, Jr.
Albin H. Warth.
By Cushman Darby & Cushman
Attorneys Patented Oct. 23, 1945

2,387,439

UNITED STATES PATENT OFFICE 2,387,439

METHOD OF SEALING CONTAINERS

Andrew P. Grabus, Jr., and Albin H. Warth, Baltimore, Md., assignors to Crown Cork & Seal Company, Inc., Baltimore, Md., a corporation of New York Application February 5, 1942, Serial No. 429,694

2 Claims. (Cl. 226—83)

The present invention relates to an improved method for sealing containers by means of caps including separable liners or discs provided on the exposed face with a film of thermoplastic adhesive, and to a shaker cap adapted for use in accordance with the new method.

While the invention may be carried out in a number of ways, each involves the heating from an external source of at least the container lip to a temperature at which the thermoplastic adhesive will soften. The container may be in the form of a glass jar or bottle having a threaded neck, and the closure in the form of a complementarily threaded cap of metal, plastic, or the like, and carrying the separable disc provided on its exposed face with the thermoplastic adhesive, there being, when desired, a cushion disc interposed between the adhesive disc and the top of the cap and fixed in the cap as a reseal provision.

Particular modes of practice of the invention are determined by factors such as the nature of the commodity to be packaged and the material of which the closure is made. For example, in the case of a non-inflammable commodity and a plastic closure, the container can be quickly heated by an open flame and the closure then applied. Where the commodity will not be injured by heat, the container can be heated to a suitable temperature and then filled, and the cap applied. In the case of an inflammable commodity the container will be filled and the cap applied prior to the application of heat.

Where the container, or at least its lip portion, is heated prior to the application of the cap, it is only necessary to engage the closure with the container to tightly press the adhesive against the container lip, the adhesive immediately softening and then hardening as the lip cools so that a bond is formed throughout between the adhesive disc and the lip. Where the cap is applied prior to heating, it is engaged with the container in a manner to tightly press the adhesive against the container lip. Due to the thinness of the film of adhesive, there is no appreciable flow of the adhesive under heat and pressure and consequently no appreciable loosening of the closure, so that it is unnecessary to re-tighten it.

By localizing the heat application at the container lip, the temperature of the container contents is not greatly affected, and there is no substantial expansion of the gaseous portion of the container contents. Thus, if the closure is applied subsequently to this localized heating, there is no substantial subsequent contraction of the gaseous portion of the contents and consequently no vacuum effect such as would tend to bulge the adhesive disc inwardly with the possibility of rupture, or injury to the bond between the disc and the lip. In the case of the closure applied prior to heating, it is unnecessary to vent the slight expansion resulting from localized heat application and it follows that, as before, there is no vacuum effect upon cooling such as would tend to rupture the disc or break the bond between it and the container lip.

The above discussed modes of practicing the invention are illustrated by way of example in the accompanying drawing, in which:

Figure 1 shows in cross section a gas flame heating tunnel, conveyor means, and, in elevation, an open container which is traversing the tunnel on the conveyor means in such manner that the direct application of heat is confined to the vicinity of the container lip.

Figure 2 is an axial section of the container neck with the closure applied in accordance with the invention.

Figure 3 shows in perspective the container neck and closure of Figure 2 with the closure removed from the container, except for the adhesive disc which remains applied.

Figure 4 shows in cross section a modified form of heating tunnel and, in elevation, a container with applied closure.

Figure 5 is a view like that of Figure 4, but showing a further modified form of heating tunnel.

Figure 6 is an axial section of a new form of shaker cap in accordance with the invention, and Figure 7 is an axial section of a container neck and of the cap of Figure 6 showing the cap removed with the exception of the adhesive disc In Figure 1, reference numeral 10 designates a container, here shown as a glass bottle or jar, the neck 11 of the container being provided with external screw threads 12 and terminating upwardly in a flat lip 13. The container is supported on a conveyor belt 21 with its upper end projecting into an inverted channel 20 having depending flanges or walls 22 between which the neck of the container is received. Gas burners 23 are mounted in the walls 22 and are in connection with supply conduits 24, the nozzles being arranged to direct flames 25 against opposite sides of the neck 11. If the container 10 has already been filled, the heating tunnel need be of only short extent, since the flames will quickly bring the container lip to a temperature which will soften the adhesive of the subsequently applied cap, and it is unnecessary to retain this temperature more than the period required for the immediate application of the cap. However, if the container is to be subsequently filled, it will obviously be necessary to allow for a period of heat retention such as will enable the filling operation to be carried out before the temperature of the lip has fallen below a point at which it will properly soften the adhesive. Regardless of which of these courses is followed, Figure 2 shows a cap as subsequently applied.

Referring to Figure 2, reference numeral 14 designates a cap comprising a metal shell having a skirt portion 15 provided with threads 16 complementary to the threads 12 of the container 10. Fixed in the cap against the top wall thereof is a cushion disc 17 of any suitable material, for example, pulp board. Separably retained in the cap, as by the cap threads, is a thin disc 18 shown in exaggerated thickness, which may be of foil, having a lacquer coating, if desired, or other suitable material. For example, the disc may be made of rubber-hydrochloride, Vinylite, cellulose acetate butyrate, or the so-called moisture-proof Cellophanes. We prefer not to use materials which show a considerable coefficient of water vapor penetration, such as plain Cellophane or the fibrous papers unless the latter are waxed or specially treated in some manner to make them vapor-proof.

Applied to the lower or exposed face of disc 18 is a film or thin coating 19, shown in exaggerated thickness, of any suitable thermoplastic material and while this film is shown in Figure 2 as being coextensive with the face of disc 18, it may be confined to the lower margin of the disc where it will contact with the lip 13 when the cap is applied. Thermoplastic resins or any other suitable thermoplastic material may be employed as the coating material. The thermoplastic film is of such nature as not to be affected at normal temperatures, but will soften quickly when heated, will set rapidly, is odorless, non-absorptive, and will not contaminate the contents of the container if contacted thereby.

When the closure 14 is tightly screwed onto the previously heated container neck, the marginal portion of the coating is tightly pressed against the heated lip and immediately softens and then hardens, as the container cools, to form a bond throughout between disc 18 and the lip 13, and in view of the impervious nature of the adhesive disc the container contents will be maintained in the condition as packed. There is no breathing whatever and consequently the products will be kept full-flavored as when packaged.

When the contents are to be used, the cap shell and therewith the disc 17 are threaded off, the adhesive disc 18 remaining in sealing relation to the container as shown in Figure 3. The sealing disc may now be ruptured or peeled off and in the latter case heat may be applied if desired for the purpose of softening the adhesive. If the contents are only partially used, the closure, now consisting only of the shell and the cushion disc 17, may be reapplied, the disc 17 sealing against the container lip. If desired, the lower face of the cushion disc may be coated with some protective substance in order that the container contents may not be affected when the cap is used as a re-seal.

In Figure 4, the container is assumed to be traveling on a conveyor as in Figure 1. In this case, however, there is provided in the inverted channel 26 an electric strip heater 27 which extends longitudinally of the channel, slightly above the top of the container. The cap 14 has previously been applied to the unheated filled container by screwing it tightly on the container neck so that the marginal portion of the adhesive film is tightly pressed against the container lip. Both the cap and container lip become heated during passage along the tunnel so that the ahesive softens and then hardens to form the bond when the closure and container cool. As previously stated, the adhesive film is so thin that there is no substantial flow thereof as the result of softening under compression and, consequently, there is no need to re-tighten the closure after cooling.

In Figure 5, the arrangement is like that of Figure 4 except that a steam pipe 28 within the inverted channel 29 replaces the electric strip heater of Figure 4.

In Figures 6 and 7 the cap 32 comprises a top wall 33 and a skirt 34, the former being provided in its central portion with perforations 35 and the latter being formed with threads 36 cooperable with threads 37 on the neck of a bottle 38 to draw the cap toward the bottle lip. A cushion ring 39 lies against the upper portion of skirt 34 and against the top wall 33 outwardly of the perforations 35. The ring may be adhered to the cap or merely retained therein by friction against loss. An imperforate disc 40, provided on its exposed face with a film 41 of thermoplastic adhesive is separably retained in the cap, as by the cap threads, with its margins underlying the ring cushion 39.

When the cap is applied to the container and screwed down tightly, the cushion ring 39 exerts an even marginal pressure on the thermoplastic film so that a continuous seal is assured when the adhesive has been softened and has been allowed to cool. When the cap is unscrewed, as shown in Figure 7, the disc 40 is left behind and can be removed as heretofore described. The ring gasket 39 is shown as adhering to the cap shell, but since it does not obstruct the openings 35, the cap is utilizable as a shaker head when reapplied to the container after the sealing disc 40 has been removed. If the gasket remains behind with the disc upon removal of the shell, it can be discarded, since its presence will no longer be required unless, in order to reseal the container, the disc 40 has been carefully removed for that purpose or a replacement disc is available.

The invention is particularly concerned with the packaging of unheated commodities and in preferred practice a heated commodity will be permitted to cool and then the container neck, or neck and closure, will be subjected momentarily to localized external heat to achieve the adhesive-softening temperature required. If the container contents are hot throughout when the bond is effected between the adhesive disc and the container lip, the vacuum effect which will exist upon cooling of the contents may be such as to damage the adhesive disc or the bond between it and the container.

While we have shown threaded metal caps, it will be understood that any other suitable means for engaging the closure with the container may be used, and the closure may be made of other materials, for example any suitable plastic. If the plastic closure is used it will ordinarily be applied subsequent to the heating operation, especially where flame heating, as in Figure 1, is employed.

It will be understood that the invention extends beyond the specific disclosure herein to such variations in procedure and structure as fall within the following claims.

We claim:

1. The method of sealing a container by means of a cap engageable with the container and having therein a separable disc provided on its exposed face with a film of thermoplastic adhesive, said container having a lip defining a mouth, said method comprising heating the container lip from an external source to a temperature at which the adhesive will soften, applying the cap over the lip and engaging it with the container to tightly press the adhesive against the lip so that the adhesive will be softened, and permitting the adhesive to harden under pressure maintained by the applied cap, the container contents being sufficiently cool at the time of the heat application and being negligibly affected by said application so that no vacuum injurious to the applied disc can develop in the container.

2. The method of sealing a container by means of a cap engageable with the container and having therein a separable disc provided on its exposed face with a film of thermoplastic adhesive, said container having a lip defining a mouth, said method comprising applying the cap over the lip and engaging it with the container to tightly press the adhesive against the lip, heating the cap and container lip from an external source sufficiently to soften the adhesive, and permitting the adhesive to harden under pressure maintained by the applied cap, the container contents being sufficiently cool at the time of the heat application and being negligibly affected by said application so that no vacuum injurious to the applied disc can develop in the container.

ANDREW P. GRABUS, Jr.
ALBIN H. WARTH.